Figure 1:
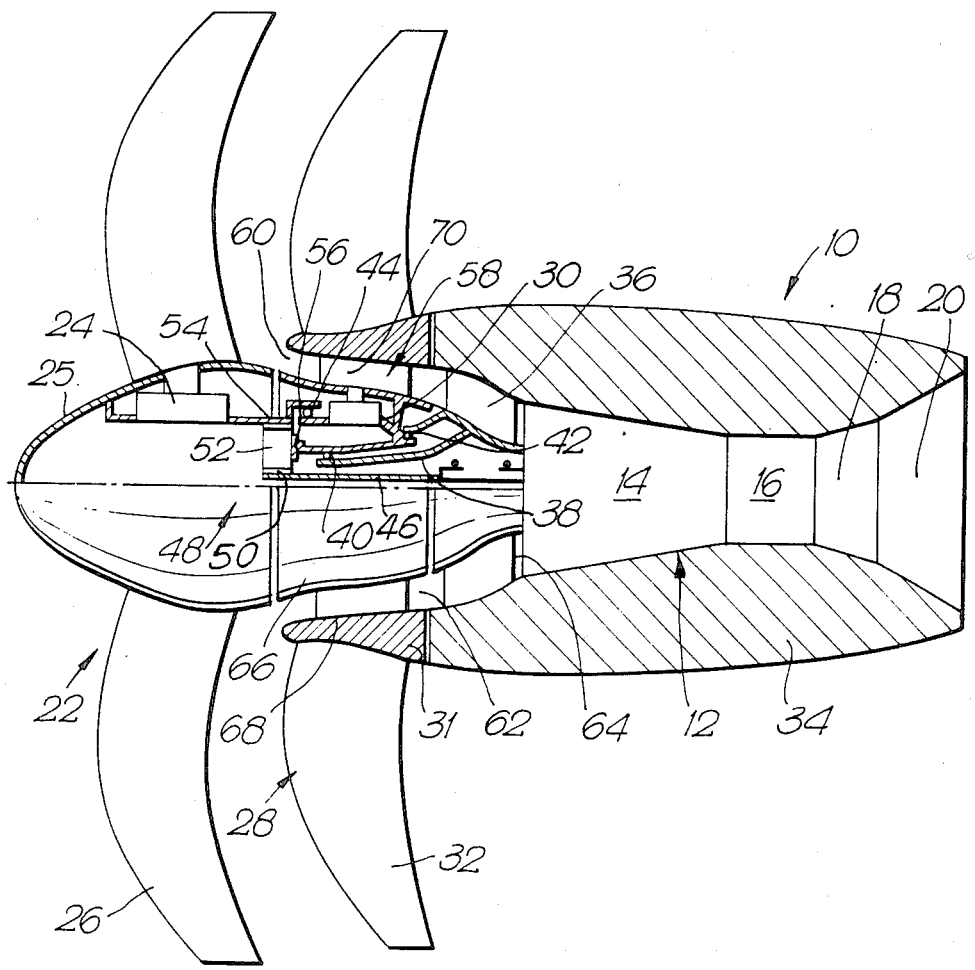

United States Patent [19]

Farrar et al.

[11] Patent Number: 4,796,424
[45] Date of Patent: Jan. 10, 1989

[54] INTAKE FOR A TURBOPROPELLER GAS TURBINE ENGINE

[75] Inventors: Peter G. G. Farrar, Derby; Eric Wright, Nottingham; Nicholas J. Peacock, Derby, all of England

[73] Assignee: Rolls-Royce plc, London, England

[21] Appl. No.: 76,712

[22] Filed: Jul. 22, 1987

[30] Foreign Application Priority Data

Oct. 16, 1986 [GB] United Kingdom ............... 8624833

[51] Int. Cl.⁴ .............................................. F02K 3/02
[52] U.S. Cl. ................................. 60/268; 416/129; 244/69
[58] Field of Search ............... 60/226.1, 268; 244/65, 244/67, 68, 69; 416/124, 125, 126, 127, 128, 129

[56] References Cited

U.S. PATENT DOCUMENTS

| 2,404,716 | 7/1946 | Heppner | 416/129 |
| 2,681,191 | 6/1954 | Elliot | 416/129 |
| 3,084,889 | 4/1963 | Irbitis | 244/65 |
| 3,811,791 | 5/1974 | Cotton | 416/129 |

FOREIGN PATENT DOCUMENTS

| 1005734 | 4/1952 | France | 416/127 |
| 620249 | 3/1949 | United Kingdom . |
| 638079 | 5/1950 | United Kingdom . |
| 647632 | 12/1950 | United Kingdom . |
| 777572 | 6/1957 | United Kingdom . |
| 2150980 | 7/1985 | United Kingdom . |

Primary Examiner—Louis J. Casaregola
Attorney, Agent, or Firm—Cushman, Darby & Cushman

[57] ABSTRACT

The invention relates to intakes for turbopropeller gas turbine engines of the tractor type. A tractor turbopropeller gas turbine engine comprises a gas generator, an upstream propeller and a downstream propeller. The propellers are positioned upstream of the gas generator, and the propellers are driven via shaft means and gear means. An intake means supplies air to the gas generator, the intake means comprises an intake opening and an intake duct. The intake opening is positioned axially between the propellers, and a portion of the intake duct extends axially through the downstream propeller. This arrangement reduces the length of the shaft and the turbopropeller gas turbine engine, and reduces the weight accordingly. The intake opening is arranged to provide improved protection against ingestion of large foreign objects, such as birds, into the intake duct and gas generator.

8 Claims, 1 Drawing Sheet

INTAKE FOR A TURBOPROPELLER GAS TURBINE ENGINE

The present invention relates to intakes for turbopropeller gas turbine engines with two propellers and is particularly concerned with turbopropeller gas turbine engines in which the propellers are positioned upstream of a gas generator, commonly known as tractor turbopropeller gas turbine engines.

The air intakes for tractor turbopropeller gas turbine engines are generally of an annular form, a chin form or bifurcated form and are positioned downstream of the propellers.

There is a need particularly for higher speed subsonic aircraft for substantial intake duct length to enable efficient diffusion of the air before it enters the gas generator.

Tractor turbopropeller gas turbine engines require a shaft to link a power turbine at the downstream end of the gas generator to the propellers upstream of the gas generator. The power shaft which passes coaxially through the gas generator must be strong and stable, and must not affect the gas generator. There is generally a conflict between the diameter required by the power shaft and the diametral space available within the gas generator, which may be resolved by shortening the power shaft.

Clearly the intake duct length required becomes a determinant factor in the overall length of the power shaft and the engine. The positioning of the intake duct downstream of the propellers produces a relatively long power shaft and engine, and also a relatively heavy structure.

The present invention seeks to provide a tractor turbopropeller gas turbine engine which has an intake duct positioned so as to reduce the length of the power shaft and engine.

Accordingly the present invention provides a turbopropeller gas turbine engine comprising a gas generator, an upstream propeller and a downstream propeller, the gas generator comprising in flow series compressor means, combustor means and turbine means, the upstream propeller and the downstream propeller being positioned upstream of the gas generator, the turbine means being arranged to drive the upstream propeller and the downstream propeller via shaft means and gear means, intake means for supplying air to the gas generator comprising an intake opening and an intake duct, the intake opening being positioned axially between the upstream propeller and the downstream propeller, the intake duct being defined at its radial extremity at least partially by a spinner of the downstream propeller whereby the intake duct extends axially through the downstream propeller.

The upstream propeller and the downstream propeller each have a respective shaped spinner, the intake opening being formed flush with the spinners, the intake duct being angled with respect to the air flow over the spinners whereby ingestion of foreign objects into the intake opening and intake duct is prevented or at least reduced.

The gear means may be positioned axially between the upstream propeller and the downstream propeller.

The upstream propeller and downstream propeller may be driven in opposite directions by the gear means.

The gear means may comprise a sun gear, a plurality of planet gears meshing with and driven by the sun gear and an annulus gear meshing with and driven by the planet gears, the planet gears being rotatably mounted in and driving a planet carrier.

The annulus gear may drive the upstream propeller and the planet carrier may drive the downstream propeller.

The planet carrier may drive the upstream propeller and the annulus gear may drive the downstream propeller.

The intake opening may be annular, and the intake duct may be annular.

The invention will be more fully described by way of reference to the accompanying drawing in which FIG. 1 is a partially cut away view of a turbopropeller gas turbine engine according to the present invention.

A turbopropeller gas turbine engine 10 according to the present invention comprises a gas generator 12, an upstream propeller 22 and a downstream propeller 28. The gas generator 12 comprises in flow series compressor means 14, combustor means 16 and turbine means 18, 20. The compressor means 14 may comprise only a high pressure compressor or it may comprise in flow series a low pressure compressor and a high pressure compressor. The turbine means 18 may comprise only a high pressure turbine for driving the high pressure compressor, or it may comprise in flow series a high pressure turbine and a low pressure turbine for driving the high and low pressure compressors respectively. The turbine means 20 is a power turbine arranged to drive the upstream propeller 22 and downstream propeller 28 via a drive shaft 46 and gear means 48. The gas generator 12 operates conventionally and its operation will not be discussed further.

The upstream propeller 22 and the downstream propeller 28 are positioned axially upstream of the gas generator 12 and are arranged coaxially therewith. The upstream propeller 22 comprises a plurality of variable pitch propeller blades 26 rotatably mounted on a propeller hub 24. The propeller hub 24 carries and is enclosed by an aerodynamically shaped spinner 25. The downstream propeller 28 comprises a plurality of variable pitch propeller blades 32 rotatably mounted on a propeller hub 30. The propeller hub 30 carries and is enclosed by an aerodynamically shaped spinner 31.

The gas generator 12 is enclosed by a gas generator casing 34, and a plurality of struts 36 extend radially inwards from the upstream end of the casing 34 to carry an axially upstream extending support structure 38. The support structure 38 extends coaxially into the downstream propeller 28, and the propeller hub 30 of the downstream propeller 28 is rotatably mounted on the support structure 38 by axially spaced bearings 40 and 42.

The propeller hub 24 of the upstream propeller 22 is rotatably mounted on the propeller hub 30 of the downstream propeller 28 by bearings 44.

The drive shaft 46 extends coaxially through the gas generator 12 and the support structure 38 to drive the upstream and downstream propellers via the gear means 48. The gear means 48 comprises a sun gear 50 secured to and driven by the drive shaft 46, a plurality of planet gears 52 meshing with and driven by the sun gear 50, and an annulus gear 54 meshing with and driven by the planet gears 52. The planet gears 52 are rotatably mounted in a planet carrier 56 by bearings ie roller or other suitable bearings.

The annulus gear 54 is drivingly connected to the propeller hub 24 of the upstream propeller 22 and the planet carrier 56 is drivingly connected to the propeller hub 30 of the downstream propeller 28 to drive the upstream and downstream propellers in opposite directions.

It may be desirable to drivingly connect the annulus gear 54 to the propeller hub 30 of the downstream propeller 28, and to drivingly connect the planet carrier 56 to the propeller hub 24 of the upstream propeller 22.

The gear means 48 is positioned ideally axially between the propellers 22 and 28 to minimise the length of the drive shaft 46 and the engine, although it may be positioned within the hub of either of the propellers or downstream of both between the downstream propeller and the gas generator.

An intake means 58 is provided for supplying air to the gas generator 12. The intake means comprises an annular intake opening 60, positioned axially between the upstream propeller 22 and the downstream propeller 28, and an annular intake duct which comprises a first annular intake duct portion 62 which extends axially through the spinner 31 of the downstream propeller, and a second annular intake duct portion 64 which is positioned downstream of the first annular intake duct portion 62 and which extends to the gas generator 12.

The annular intake opening 60 is formed between the spinners 25 and 31, and the spinners are shaped so that the annular intake opening 60 is flush with the exterior surface of the spinners. The first annular intake duct portion 62 is defined by an outer wall 68 and an inner wall 66 of the spinner 31, and a plurality of aerodynamically shaped struts 70 extend radially across the duct portion 62. The annular intake duct is arranged at an angle to the direction of flow of air over the spinners, and the annular intake duct reduces in diameter in an axially downstream direction.

The positioning of the annular intake opening 60 between the propellers, and having the annular intake duct portion 62 extending through the propeller 28 provides a number of advantages over the prior art.

The length of the shaft 46 and the turbopropeller gas turbine engine 10 is reduced by an amount substantially the same as the axial distance between the propeller blades, while providing an adequate intake duct length for diffusion of the intake air.

The annular intake opening 60 is flush with the spinners 25 and 31, and there is a minimum radial distance between the radially outer extremity of the spinner 25 and the upstream end of the spinner 31. The angling of the annular intake duct with respect to the air flow which passes over the exterior surfaces of the spinners and the gas generator casing provides improved protection against ingestion of large foreign objects, such as birds, into the annular intake duct and gas generator. This is because the inertia of large or heavy foreign objects, tends to carry the object with the flow of air which passes over the exterior surfaces of the spinners and over the gas generator casing, but a portion of the air may flow easily into the annular intake duct.

The diameter of the gas generator casing is reduced, because the annular intake opening is at a reduced diameter.

The air flowing through the annular air intake duct portion 62 is warmed by its passage over the inner wall 66 and outer wall 68 of the spinner 31. The inner wall 66 is warmed because of its close proximity to the gear means 48, and outer wall 68 may be warmed by passing warm air radially through strut 70, and this eliminates or at least reduces ice formation in the annular intake duct portion 62, and obviates or at least reduces the requirement for anti-icing equipment for the intake duct.

The losses in the air flowing into the inlet opening are offset by some proportion of the pressure rise obtained across the upstream propeller, and also by the pressure rise obtained from the aerodynamic struts 70.

Although the description has gear means which drive the propellers in opposite directions it could be equally possible to arrange for the gear means to drive the propellers in the same direction, but at different speeds.

We claim:

1. A turbopropeller gas turbine engine comprising a gas generator, an upstream propeller, a downstream propeller, shaft means, gear means and intake means, the gas generator comprising in flow series compressor means, combustor means and turbine means, the upstream propeller and the downstream propeller being positioned upstream of the gas generator, the turbine means being arranged to drive the upstream propeller and the downstream propeller via the shaft means and the gear means, the intake means supplies air to the gas generator, the intake means comprises an intake opening and an intake duct, the intake opening being positioned axially between the upstream propeller and the downstream propeller, the intake duct being defined at its radial extremity at least partially by a spinner of the downstream propeller whereby the intake duct extends axially through the downstream propeller.

2. A turbopropeller gas turbine engine as claimed in claim 1 in which the upstream propeller and the downstream propeller each have a respective shaped spinner, the intake opening being formed flush with the spinners, the intake duct being angled with respect to the air flow over the spinners whereby ingestion of foreign objects into the intake opening and intake duct is prevented or at least reduced.

3. A turbopropeller gas turbine engine as claimed in claim 1 in which the gear means is positioned axially between the upstream propeller and the downstream propeller.

4. A turbopropeller gas turbine engine as claimed in claim 1 in which the upstream propeller and the downstream propeller are driven in opposite directions by the gear means.

5. A turbopropeller gas turbine engine as claimed in claim 4 in which the gear means comprises a sun gear, a plurality of planet gears, an annulus gear and a planet carrier, the plurality of planet gears meshing with and being driven by the sun gear, the annulus gear meshing with and being driven by the planet gear, the planet gears being rotatably mounted in and driving the planet carrier.

6. A turbopropeller gas turbine engine as claimed in claim 5 in which the annulus gear drives the upstream propeller and the planet carrier drives the downstream propeller.

7. A turbopropeller gas turbine engine as claimed in claim 5 in which the planet carrier drives the upstream propeller and the annulus gear drives the downstream propeller.

8. A turbopropeller gas turbine engine as claimed in claim 1 in which the intake opening is annular, and the intake duct is annular.

* * * * *